United States Patent [19]

Wise

[11] Patent Number: 4,842,402
[45] Date of Patent: Jun. 27, 1989

[54] PROJECTION AND VIEWING APPARATUS

[75] Inventor: David S. Wise, Solon, Ohio

[73] Assignee: McGraw-Hill, Inc., New York, N.Y.

[21] Appl. No.: 857,848

[22] Filed: Apr. 30, 1986

[51] Int. Cl.⁴ .................. G03B 21/10; G03B 21/30
[52] U.S. Cl. .......................... 353/74; 353/44; 312/7.2
[58] Field of Search .................. 353/74–78, 353/44, 99, 79; 350/121; 362/97; 108/3, 4, 8; 312/7.2, 276, 313

[56] References Cited

U.S. PATENT DOCUMENTS

| | | | |
|---|---|---|---|
| 1,306,861 | 6/1919 | Sparkes | 353/44 |
| 2,782,680 | 2/1957 | Howell | 353/78 |
| 3,381,574 | 5/1968 | Wells | 353/78 |
| 3,912,350 | 10/1975 | Gurubatham | 312/276 |
| 4,136,938 | 1/1979 | Wise | 353/78 |
| 4,174,889 | 11/1979 | Peters | 353/78 |
| 4,194,452 | 3/1980 | Crowther et al. | 312/276 |

FOREIGN PATENT DOCUMENTS 676102  2/1930  France ................ 353/79

*Primary Examiner*—Allan N. Shoap
*Assistant Examiner*—Patrick R. Scanlon
*Attorney, Agent, or Firm*—Darby & Darby

[57] ABSTRACT

A projection and viewing apparatus having a hollow housing with an open top and front and back walls is also provided with an optical system carriage which is mounted within the housing for rotational movement with respect to the housing. This carriage is capable of rotation from an upright position to a substantially horizontal position. The carriage is composed of a lower portion which is mounted to the housing for the rotational movement and an upper portion which is pivotally mounted with respect to the lower portion so as to be able to move from an extended position in which the upper and lower positions define the operational carriage, to a retracted position in which either the upper or lower portion is withdrawn into the other. Provision is made for locking the upper and lower portions together in the extended position. The lower carriage portion is provided with a depth dimension which is no greater than the distance between the front and rear walls of the housing. Provision is made for securing the carriage within the housing in a storage position in which the lower housing portion is retained with its depth dimension aligned between the front and rear walls of the housing, and the upper and lower housing portion are retained in the retracted position.

14 Claims, 2 Drawing Sheets

FIG. 1
FIG. 2
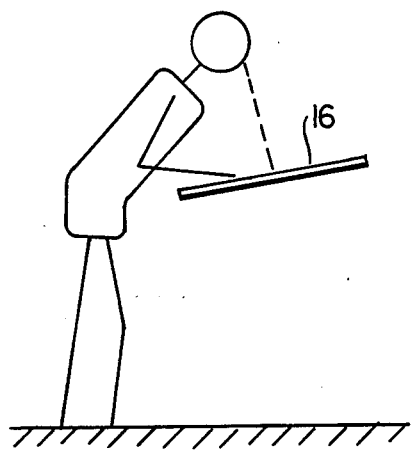
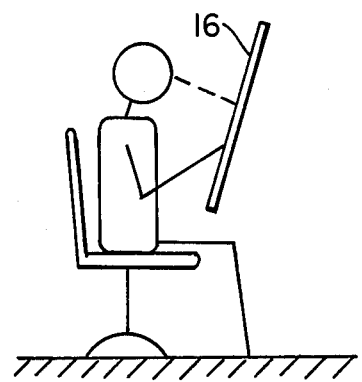
FIG. 3
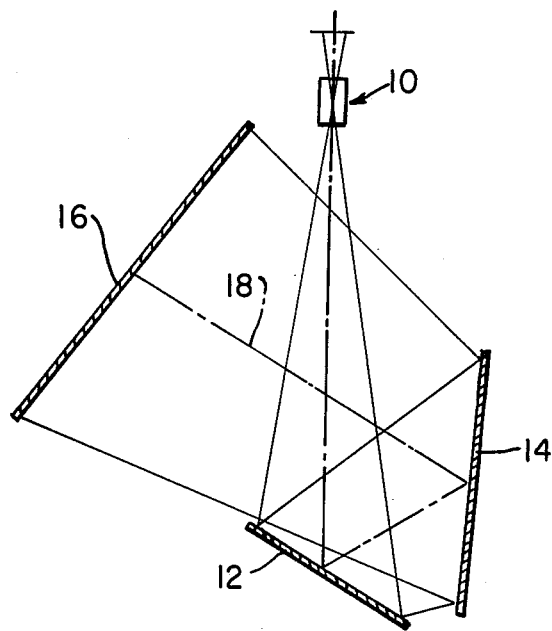

PROJECTION AND VIEWING APPARATUS

The present invention relates generally to a projection and viewing apparatus which is typically used in the manner of a drafting table and, particularly, concerns such an apparatus which is adjustable for viewing by an operator in a seated position and, at the same time, may be readily and conveniently adjusted to a transportation configuration, in which it may readily fit through narrow doorways, and the like.

Known projection and viewing apparatus utilize a viewing screen which is 30 inches or more in depth and substantially larger in width. When such apparatus must be transported, it is often necessary to be able to fit it through a narrow doorway, which may only be 27 inches wide. In order to accomplish this, the prior art apparatus has provided for tilting the viewing screen to an upright position. For example, in my own U.S. Pat. No. 4,136,938 I disclose a projection apparatus which includes such a viewing screen, but has a main body that is narrow enough to fit through a doorway. When the device is to be transported, the viewing screen is tilted downwardly to a substantially inclined position, so that it occupies no greater width than the main body. This apparatus includes a triangular mirror structure which projects downwardly into the main body. In order to bring the screen to the transportation position, without occupying a greater width than the main body, it is necessary to access the interior of the main body and to collapse the mirror construction so that it is entirely contained within the main body.

The projection and viewing apparatus in my own U.S. Pat. No. 4,136,938 also permits the viewing screen to be tilted to a position where it may be viewed by a seated operator. However, this requires that the mirror structure be tilted out of the back of the apparatus, where it may be exposed to possible damage. In addition, such use requires that the apparatus be positioned at a substantial distance away from any wall, and that it therefore occupy a substantially greater amount of floor space.

Broadly, it is an object of the present invention to provide a projection and viewing apparatus which overcomes the disadvantages of prior art devices. It specifically contemplates that the device may readily and conveniently be adjustable to a transportation position in which the entire apparatus occupies a sufficiently narrow width to fit through a narrow doorway.

Another object of the present invention is to provide a projection and viewing apparatus of the type described which does not require substantial disassembly and reassembly in order to bring the viewing screen from a position appropriate for a standing operator to a position appropriate for a seated operator or for bringing the entire apparatus to a "collapsed" transportation position.

It is another object of the present invention to provide a projection and viewing apparatus in which it is unnecessary to move the entire apparatus when the viewing screen is moved from a position appropriate for a standing operator to a position appropriate for a seated operator.

It is the further object of the present invention to provide a projection and viewing apparatus of the type described in which the mirror components of the optical system are included in an enclosure and do not protrude from the main housing of the apparatus during use.

It is also an object of the present invention to provide a projection and viewing apparatus of the type described which is reliable and convenient in use, yet relatively inexpensive in construction.

In accordance with the present invention, a projection and viewing apparatus having a hollow housing with an open top and front and back walls is also provided with an optical system carriage which is mounted within the housing for rotational movement with respect to the housing. This carriage is capable of rotation from an upright position to a substantially horizontal position. The carriage is composed of a lower portion which is mounted to the housing for the rotational movement and an upper portion which is pivotally mounted with respect to the lower portion so as to be able to move from an extended position in which the upper and lower portions define the operational carriage, to a retracted position in which either the upper or lower portion is withdrawn into the other. Provision is made for locking the upper and lower portions together in the extended position. The lower carriage portion is provided with a lateral dimension which is no greater than the distance between the front and rear walls of the housing, and provision is made for securing the carriage within the housing in a storage position in which the lower housing portion is retained with its lateral dimension aligned between the front and rear walls of the housing, and the upper and lower housing portion are retained in the retracted position.

The foregoing brief description, as well as further objects, features and advantages of the present invention will be more completely understood from the following detailed description of a presently preferred, but nonetheless illustrative, embodiment of the present invention, with reference being had to the drawing, in which:

FIG. 1 illustrates the position of the viewing screen for an operator in the standing position;

FIG. 2 illustrates the position of the viewing screen for an operator in the seated position;

FIG. 3 illustrates the optical system of the apparatus of the present invention;

DETAILED DESCRIPTION

Figure 4:
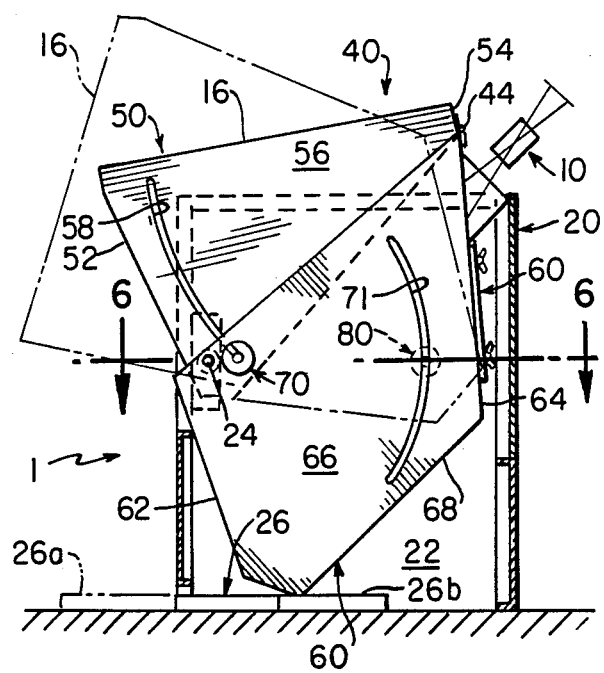
FIG. 4 is a side view of a projection and viewing apparatus in accordance with the present invention, with the housing being shown in section, to permit certain interior details to be seen.

Turning now to the details of the drawing, FIGS. 1 and 2 illustrate the two extreme positions in which an apparatus in accordance with the present invention may be viewed. In FIG. 1, the apparatus is being viewed by a relatively tall individual in the standing position. The viewing screen (16) is oriented in the manner of a traditional, upright drafting table, forming an angle of about 10° with the horizontal. The front of the table is at a height of 38.5 inches. In FIG. 2, the apparatus is being viewed by a relatively short individual in the seated position. The viewing screen (16) forms an angle of about 73° with the horizontal, and the front edge of the screen must be at a height of about 24 inches, to permit adequate leg clearance.

FIG. 3 illustrates, in schematic form, the structure of the optical system of a projection apparatus in accordance with the present invention. The optical system comprises: a projection head 10; first and second mirrors 12 and 14; and a viewing screen 16. The mirrors 12, 14 and the viewing screen 16 lie in planes which are perpendicular to a common plane (i.e the plane of the drawing) and which form acute angles with respect to each other. The projection head 10 is positioned so that the optical axis 18 crosses itself at a point between the mirrors 12, 14 and the viewing screen 16. This construction permits minimization of the space occupied by the optical system.

Projection head (10) may be an conventional commercially available microfilm projection head, but is preferably a model 40 projection head manufactured by Tameran, Inc. of Chagrin Falls, Ohio.

Figure 5:
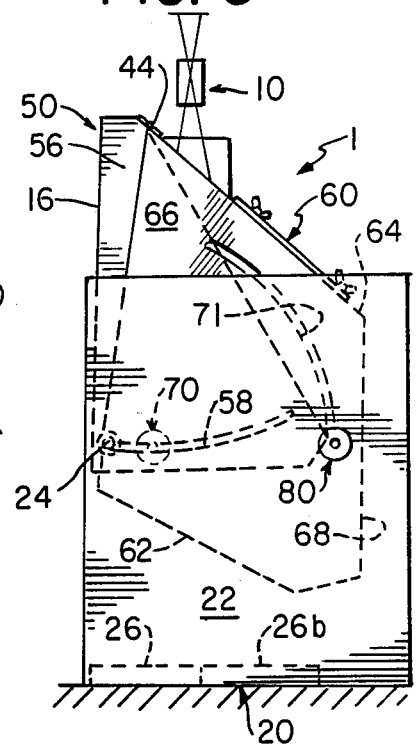
FIG. 5 is a side view of a projection and viewing apparatus embodying the present invention, with the optical system carriage shown as secured in its transportation position.
Figure 6:
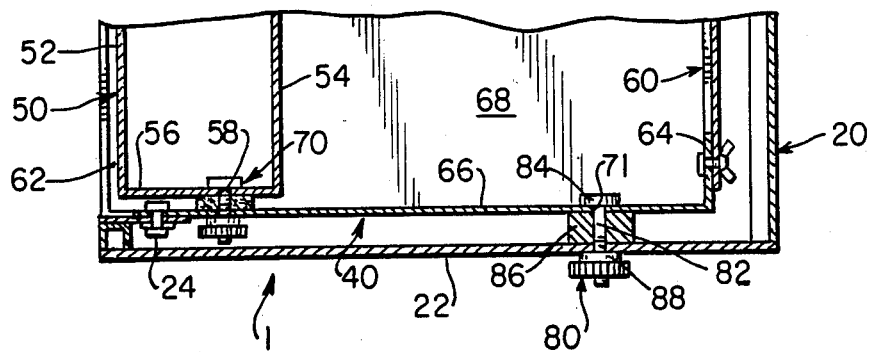
FIG. 6 is a fragmentary sectional view on an enlarged scale, taken along line 6—6 in FIG. 4 and looking in the direction of the arrows.

FIGS. 4-6 illustrate an optical projection and viewing apparatus 1 embodying objects and features of the present invention. The two major components of the apparatus 1 are an exterior housing 20 and an optical system carriage 40. Housing 20 includes a pair of opposite end walls 22, and carriage 40 is pivotally mounted with respect to housing 20 by means of pivot pins 24. or the like, which pass through either end wall 22 and into the carriage 40. As may best be seen in FIG. 4, this mounting permits the carriage 40 to be pivoted from an upright position, shown in solid lines, to a nearly horizontal position, shown in phantom. The upper wall of the carriage 40 includes the viewing screen 16, so that this pivotal motion of the carriage permits the movement of viewing screen 16 between the two previously discussed extreme positions. When the carriage 40 is in its nearly horizontal position, the apparatus 1 tends to be marginally stable, and might tilt forward, particularly if the user leaned on it. In order to improve stability, housing 20 is provided with a stabilizing platform 26, which is maintained in a position 26a during use, but may be retracted to a storage position 26b. This is made possible by mounting the storage platform 26 for sliding movement with respect to housing 20, by conventional means.

Carriage 40 comprises an upper component 50 and a lower component 60. These two components 50, 60 are connected for relative pivotal movements by means of hinges 44, whereby component 50 may be pivoted with respect to component 60, to be retracted therein to see FIG. 5. During use, however, component 50 is maintained in an extended position and is locked in that position by locking means, to be discussed more fully below. The upper surface of upper component 50 includes the viewing screen 16. Component 50 also has front and rear walls 52, 54 and side walls 56, 56, so as to form a complete enclosure. The bottom of component 50 is, however, open and its interior should be unobstructed, so as to permit an unobstructed light transmission path.

Lower component 60 includes front and rear walls 62, 64 side walls 66, 66 and a bottom wall 68. The first and second mirrors 12, 14 of the optical system are mounted on the interior of the front and bottom walls 62 and 68 respectively, while the projection head 10 is mounted near the top at the exterior of front wall 64.

In normal use, upper component 50 is locked in its extended position to lower component 60. As can be seen in FIG. 4, the entire carriage 40 may then be pivoted between its horizontal position (shown in phantom) and its upright position (shown in solid lines), and it may be locked for use in either of these two positions or at intermediate positions. The platform 26 is also extended during such use.

When it is desired to transport the apparatus 1, carriage 40 is tilted to an intermediate or transportation position see FIG. 5, and it is locked in that position. Upper component 50 is then released and brought into its retracted position, where it is locked. Thus, with the apparatus 1 arranged as shown in FIG. 5, it assumes a minimum width, and the various components are securely locked with respect to each other. Housing 20 is dimensioned to fit through a narrow doorway (e.g. it may be 26 inches wide, so as to fit through a 27 inch doorway). Hence, transportation of apparatus 1 is facilitated, and there is little danger of damage to any of the delicate optical components.

Referring to FIG. 4, it will be noted that upper component 50 includes an articulate slot 58 in each of its end walls 56, 56 and that lower component 60 includes an arcuate slot 71 in each of its end walls 66, 66. The slots 58, 71 are provided with locking devices 70, 80, to be described more fully below.

Locking devices 80 and their operation will be described only with respect to one of the slots 71. Each locking device 80 includes a bolt with a head 84 and a threaded shaft 82, the diameter of which is selected so that the shaft will fit freely within the slot 71. Spacer sleeves 86, 88 are mounted over the shaft portion 82 and are retained in engagement with the end walls 66 and 22. The sleeves 86, 88 are preferably made of a material having a relatively high coefficient of friction. A nut 87 in the form of a knurled wheel, or the like, is securely threaded onto shaft 82. This has the effect of locking carriage 40 with respect to housing 20 as a result of the friction. When it is desired to reposition carriage 40 with respect to housing 20, nut 87 is loosened sufficiently to permit fastener 80 to permit relative movement between the end.walls 22, 66. Carriage 40 may then be pivoted so as to permit shaft portion 82 to slide within the slot 71. When the desired position of the carriage is reached, nut 87 is once more securely screwed onto shaft 82.

Locking devices 70 are similar in operation and use to locking devices 80.

Although a preferred embodiment of the invention has been disclosed for illustrative purposes, those skilled in the art will appreciate that many additions, modifications and substitutions are possible, without departing from the scope and spirit of the invention, as defined in the accompanying claims.

What is claimed is:

1. In a projection and viewing apparatus:
    a substantially hollow housing having an open top, a front wall and a rear wall;
    an optical system carriage having a front, rear, top and bottom, said carriage having a viewing screen thereon defining a portion of an optical system;
    means defining upper and lower carriage portions mounted to be relatively adjustable to an inactive storage position and an active position, said carriage portions being retracted one into the other in said inactive position so as to be capable of being substantially contained within said housing in a substantially upright position with said viewing screen in a substantially upright position, the lateral dimension of said carriage portions in their inactive position being aligned between the front and rear walls of said housing, this lateral dimension being no greater than the distance between the front and rear walls of said housing, said carriage portions being relatively extended in said active position to define said optical system carriage in its active position wherein the carriage protrudes outside said housing;

means mounting said optical system carriage for pivotal movement relative to said housing between a position in which said viewing screen is substantially horizontal and a position in which said viewing screen is substantially vertical.

2. An apparatus in accordance with claim 1 wherein said housing further comprises platform means mounted to said housing so as to be moveable from a position within said housing to a substantially horizontal position exterior of said housing at the bottom of the front wall thereof.

3. An apparatus in accordance with claim 1 wherein a portion of said front wall in the vicinity of the top of said housing is also open to define a top opening in cooperation with the top of said housing, and said carriage protrudes forwardly through said top opening, beyond said front wall.

4. An apparatus in accordance with claim 1 wherein said viewing screen is provided in a top wall of said upper carriage portion.

5. A projection and viewing apparatus in accordance with claim 1, further comprising a projection head mounted on said carriage so as to cooperate with said viewing screen in producing an image thereon, said projection head defining a further portion of said optical system.

6. An apparatus in accordance with claim 5 further comprising a first mirror mounted within said lower carriage portion to extend generally perpendicularly to said lateral dimension, a second mirrors positioned so as to be in an upright orientation near the rear wall of said housing when said lower carriage portion is in its storage position, and said projection head being mounted on said lower carriage portion exterior thereof and opposite said first mirror.

7. An apparatus in accordance with claim 5 wherein said viewing screen is perpendicular to a predefined plane, said optical system further comprising first and second mirrors, also perpendicular to said predefined plane, and oriented so that the planes of said viewing screen and said first and second mirrors form acute angles with respect to each other, said optical system being constructed so as to have an optical axis which crosses itself at a point intermediate said projection head and said viewing screen.

8. An apparatus in accordance with claim 7 wherein said viewing screen is provided in a top wall of said upper carriage portion.

9. An apparatus in accordance with claim 8 wherein said first mirror is mounted within said lower carriage portion to extend generally perpendicularly to said lateral dimension, said second mirror is positioned so as to be in an upright orientation near the rear wall of said housing when said lower carriage portion is in its storage position, and said projection head is mounted on said lower carriage portion exterior thereof and opposite said first mirror.

10. A projection and viewing apparatus in accordance with claim 1, further comprising means for locking together said upper and lower carriage portions in at least said active position.

11. An apparatus in accordance with claim 10 wherein said means for locking includes means for locking together said upper carriage portion and said lower carriage portion in said inactive position.

12. A projection and viewing apparatus in accordance with claim 11, wherein said carriage lower portion has a lateral dimension which is no greater than the distance between the front and rear walls of said housing, said apparatus further comprising means for securing said carriage within said housing in a storage position wherein said lower carriage portion is substantially upright, with the lateral dimesion thereof aligned between the front and rear walls of said carriage when said housing portions are in their inactive position.

13. An apparatus in accordance with claim 12 wherein said securing means is constructed to also lock said carriage to said housing in its upright position and in its substantially horizontal position.

14. An apparatus in accordance with claim 12 wherein said housing is constructed so that the distance between the front and rear walls thereof is less than the width of a predefined narrow doorway.

* * * * *